US012685249B2

(12) United States Patent
Teckemeyer et al.

(10) Patent No.: US 12,685,249 B2
(45) Date of Patent: Jul. 21, 2026

(54) GRANULATE PORTIONING MEANS

(71) Applicant: AMAZONEN-WERKE H. DREYER SE & CO. KG, Hasbergen (DE)

(72) Inventors: Stephan Teckemeyer, Lotte (DE); Florenz Hilbert, Emsdetten (DE)

(73) Assignee: AMAZONEN-WERKE H. DREYER SE & CO. KG, Hasbergen (DE)

( * ) Notice: Subject to any disclaimer, the term of this patent is extended or adjusted under 35 U.S.C. 154(b) by 49 days.

(21) Appl. No.: 18/855,246

(22) PCT Filed: Aug. 11, 2023

(86) PCT No.: PCT/EP2023/072291
§ 371 (c)(1),
(2) Date: Oct. 8, 2024

(87) PCT Pub. No.: WO2024/052051
PCT Pub. Date: Mar. 14, 2024

(65) Prior Publication Data
US 2025/0268126 A1 Aug. 28, 2025

(30) Foreign Application Priority Data
Sep. 6, 2022 (DE) .......................... 102022122557.7

(51) Int. Cl.
*A01C 19/02* (2006.01)
*A01C 15/00* (2006.01)

(52) U.S. Cl.
CPC ............ *A01C 19/02* (2013.01); *A01C 15/001* (2013.01)

(58) Field of Classification Search
CPC .............................. A01C 19/02; A01C 15/001
See application file for complete search history.

(56) References Cited

U.S. PATENT DOCUMENTS 10,779,461 B2 * 9/2020 Garner ................. A01C 7/0443

FOREIGN PATENT DOCUMENTS

| | | |
|---|---|---|
| DE | 102014111777.8 A1 | 8/2014 |
| DE | 102019117555 A1 | 12/2020 |
| EP | 2550850 A1 | 1/2013 |
| EP | 2989877 A1 | 3/2016 |
| WO | 2020259925 A1 | 12/2020 |

OTHER PUBLICATIONS

German Search Report, dated Aug. 21, 2023, issued in corresponding German Patent Application No. 102022122557.7, Filed Sep. 6, 2022, with an English translation of the German Search Report.
International Search Report, mailed Nov. 20, 2023, issued in corresponding PCT Aug. 8, 2023, with English translation of the ISR.

* cited by examiner

*Primary Examiner* — Timothy L Maust
(74) *Attorney, Agent, or Firm* — PERRY + CURRIER INC.

(57) ABSTRACT

The invention relates to a granulate portioning means (10) for an agricultural spreading machine, comprising: a portioning rotor (30), which is designed to combine granulate grains during a rotational movement to form granulate portions; a housing (12), in which the portioning rotor (30) is arranged, wherein the housing comprises a housing main body (14) and a housing cover (16); and an electric drive device (18) for rotational driving of the portioning rotor (30).

13 Claims, 6 Drawing Sheets

GRANULATE PORTIONING MEANS

The invention relates to a granulate portioning means, a portioning system, an interchangeable system and a method for operating an interchangeable system.

Generic granulate portioning means usually have a portioning rotor by means of which granulate grains are combined during a rotational movement to form granulate portions. The portioning rotor can be arranged in a housing of the granulate portioning means and driven by an electric drive device of the granulate portioning means.

In practice, it has been shown that a disassembly option for the electric drive device in granulate portioning means would be advantageous for various reasons. By disassembling the electric drive device, for example, it can be serviced or repaired separately from the other components of the granulate portioning means. Further, it should also be possible to use the granulate portioning means for band placement of the granulate grains on the agricultural land, so that granulate portioning by a driven portioning rotor is not absolutely necessary.

The object of the invention is therefore to increase the modularity of a granulate portioning means and/or to design the granulate portioning means in a more universally applicable way.

The object is achieved by granulate portioning means of the type mentioned at the beginning, wherein the electric drive device of the granulate portioning means according to the invention is fastened to the housing cover and the housing cover and the electric drive device are components of a removable portioning module which is assembled on the housing main body in a non-destructive and reversibly detachable manner.

As the portioning module is assembled on the housing main body in a non-destructive and reversibly detachable manner, the housing cover and the electric drive device can be removed from the housing main body together and fitted to the housing main body. The electric drive device can therefore be disassembled together with the housing cover, for example for maintenance and/or repair, with very little effort. Further, the electric drive device can be removed if it is not required during the spreading process, for example during band application. The electric drive device can be an electric motor, for example.

In a preferred embodiment of the granulate portioning means according to the invention, the portioning rotor is a component of the removable portioning module. In this case, the portioning rotor can be removed and fitted together with the housing cover and the electric drive device. Preferably, the removable portioning module also comprises a bearing of the portioning rotor, so that the bearing of the portioning rotor can be removed and fitted together with the portioning rotor, the housing cover and the electric drive device.

Furthermore, a granulate portioning means according to the invention is advantageous in which the portioning rotor is secured to the portioning module against falling out when the portioning module is removed. This means that the portioning rotor cannot become detached from the rest of the portioning module. The fall-out protection of the portioning rotor simplifies the handling of the portioning module. This effectively prevents damage or contamination of the portioning rotor due to it accidentally falling out of the portioning module.

In a further advantageous embodiment of the granulate portioning means according to the invention, the electric drive device has a drive housing which is fastened to the housing cover. The electrical components of the electric drive device are located in the drive housing. The drive housing can be connected to the housing cover in a form-fit and/or force-fit and/or material-fit manner. The drive housing and the housing cover can be screwed and/or glued together. The drive housing can also be an integral part of the housing cover. The portioning module can have a contacting area with one or more contact poles, via which the electrical drive device is electrically contacted when fitting the portioning module to the housing main body.

A granulate portioning means according to the invention is further preferred, in which the portioning module has an inlet opening for granulate to be portioned by means of the granulate portioning means. Preferably, the housing cover carries the inlet opening. The inlet opening can be arranged on an inlet connection piece, wherein the inlet connection piece is preferably a component of the housing cover. As the portioning module carries the inlet opening, the inlet can be modified by using a different module.

In another embodiment of the granulate portioning means according to the invention, the portioning module comprises at least one wall portion of an outlet channel for granulate portions to be discharged from the granulate portioning means. Preferably, the housing main body also comprises a wall portion of the outlet channel. Preferably, the outlet channel is formed by the wall portions of the portioning module and the housing main body.

In a further development, the granulate portioning means according to the invention has one or more positioning members by means of which the portioning module can be positioned with repeat accuracy in an assembly position on the housing main body for assembling on the housing main body. The positioning members may comprise one or more pins and/or one or more pin receptacles, wherein the pins are insertable into the pin receptacles for assembling the portioning module on the housing main body. One or more pins can be arranged on the portioning module and/or on the housing main body. One or more pin receptacles can be arranged on the portioning module and/or the housing main body. During operation of the granulate portioning means, a radially outer area of the portioning rotor moves along an inner surface of the housing, which acts as a portioning track. The portioning track preferably comprises two track halves, wherein a first track half is part of the housing main body and a second track half is part of the portioning module. By means of the positioning members, the track halves can be centered in relation to one another such that the portioning rotor runs at a uniform radial distance from the track halves. The granulate portioning means can further comprise a swiveling system for the portioning module, via which the portioning module can be swiveled away from the housing main body during disassembly and swiveled towards the housing main body during assembly. For example, the swiveling system may comprise one or more hook receptacles and one or more assembly hooks. The assembly hooks can be inserted into the one or more hook receptacles in such a manner that swivel movement of the portioning module is enabled or required during assembly and/or disassembly.

The object underlying the invention is further achieved by a portioning system of the type mentioned at the beginning, wherein the granulate portioning means of the portioning system according to the invention is designed in accordance with one of the claims described above. With regard to the advantages and modifications of the portioning system according to the invention, reference is first made to the advantages and modifications of the granulate portioning means according to the invention.

The air separator of the portioning system according to the invention can be a cyclone, for example.

In a preferred embodiment of the portioning system according to the invention, the air separator is connected to the portioning module of the granulate portioning means. The air separator is preferably attached to the portioning module. The air separator can preferably be detached from the portioning module in a reversible and non-destructive manner.

The object underlying the invention is further achieved by an interchangeable system of the type mentioned at the beginning, wherein the granulate portioning means of the interchangeable system according to the invention is designed according to one of the embodiments described above and the band placement module is designed to be non-destructively and reversibly detachably assembled on the housing main body for converting the granulate portioning means from a portioning configuration to a band placement configuration instead of the portioning module and, in the assembled state, to pass an air-granulate flow through the housing of the granulate portioning means comprising the replacement housing cover without forming portions. With regard to the advantages and modifications of the interchangeable system according to the invention, reference is first made to the advantages and modifications of the granulate portioning means according to the invention.

In a preferred embodiment of the interchangeable system according to the invention, the band placement module has an inlet opening for the air-granulate flow to be passed through the granulate portioning means.

Preferably, the replacement housing cover carries the inlet opening. The inlet opening can be arranged on an inlet connection piece, wherein the inlet connection piece is preferably a component of the replacement housing cover.

In a further development of the interchangeable system according to the invention, the band placement module comprises a plug receptacle for receiving a connection plug. In the portioning configuration, the connector plug is used to make electrical contact with the electrical drive device in the portioning module and is not used in the band placement configuration.

Furthermore, an interchangeable system according to the invention is preferred, in which the band placement module comprises at least one wall portion of an outlet channel for an air-granulate flow to be discharged from the granulate portioning means. Preferably, the housing main body also comprises a wall portion of the outlet channel. Preferably, the outlet channel in the band placement configuration of the granulate portioning means is formed by the wall portions of the band placement module and the housing main body.

The object underlying the invention is further achieved by a method of the type mentioned at the beginning, wherein, within the scope of the method according to the invention, the granulate portioning means is converted from the portioning configuration to the band placement configuration by replacing the portioning module with a band placement module, so that in the band placement configuration the band placement module is assembled on the housing main body. The method according to the invention further comprises passing an air-granulate flow through the granulate portioning means without forming portions, wherein during the passing of the air-granulate flow, the granulate portioning means has the band placement configuration in which the band placement module is assembled on the housing main body of the granulate portioning means. The method according to the invention is preferably used for operating an interchangeable system according to one of the embodiments described above. With regard to the advantages and modifications of the method according to the invention, reference is thus also made to the advantages and modifications of the interchangeable system according to the invention.

Preferred embodiments of the invention are explained and described in more detail below with reference to the accompanying drawings, In the figures:

FIG. 1 shows a spreading unit 100 for spreading granulated material on agricultural land. The granulate can be fertilizer, for example.

Figure 1:
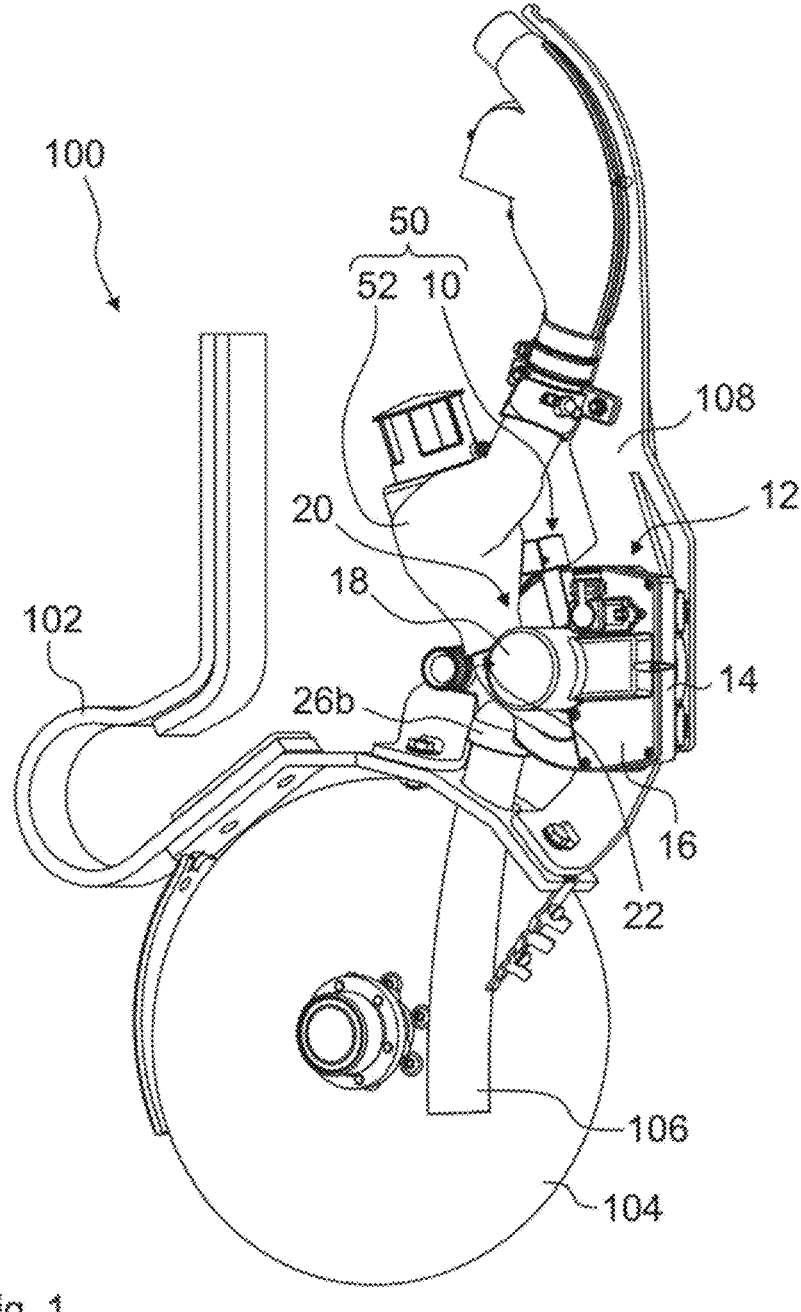
FIG. 1 shows a perspective view of a spreading unit with a portioning system according to the invention.

The spreading unit 100 comprises a carrier element 102, on which a disk coulter 104 is arranged. The disk coulter 104 is used to create a placement furrow into which the granulate can then be placed.

The spreading unit 100 further comprises a portioning system 50, wherein the portioning system 50 comprises an air separator 52 and a granulate portioning means 10. The air separator 52 is designed as a cyclone. The granulate portioning means 10 is supplied with an air-granulate flow passing through the air separator 52. Inside the air separator 52, an air portion is separated from the air-granulate flow. The air portion separated by the air separator 52 can be set via an adjustment on the air separator 52.

The granulate portioning means 10 is used to produce granulate portions, which can then be conveyed via the placement line 106 of the spreading unit 100 in the direction of the placement furrow produced by the disk coulter 104.

A housing main body 14 of the housing 12 of the granulate portioning means 10 is fastened to a carrier member 108 of the spreading unit 100. A portioning rotor 30 is arranged in the housing 12 of the granulate portioning means 10, wherein the portioning rotor 30 combines the granulate grains introduced into the housing 12 of the granulate portioning means 10 to form granulate portions by means of a rotational movement. The housing 12 further comprises a housing cover 16 which is fastened to the housing main body 14.

The granulate portioning means 10 also comprises an electric drive device 18 for rotationally driving the portioning rotor 30 arranged in the housing 12. The electric drive device 18 is an electric motor.

The electric drive device 18 is fastened to the housing cover 16. The housing cover 16, the electric drive device 18 and the portioning rotor 30 are components of a removable portioning module 20. The portioning module 20 is assembled to the housing main body 14 in a non-destructive and reversibly detachable manner.

Figure 2:
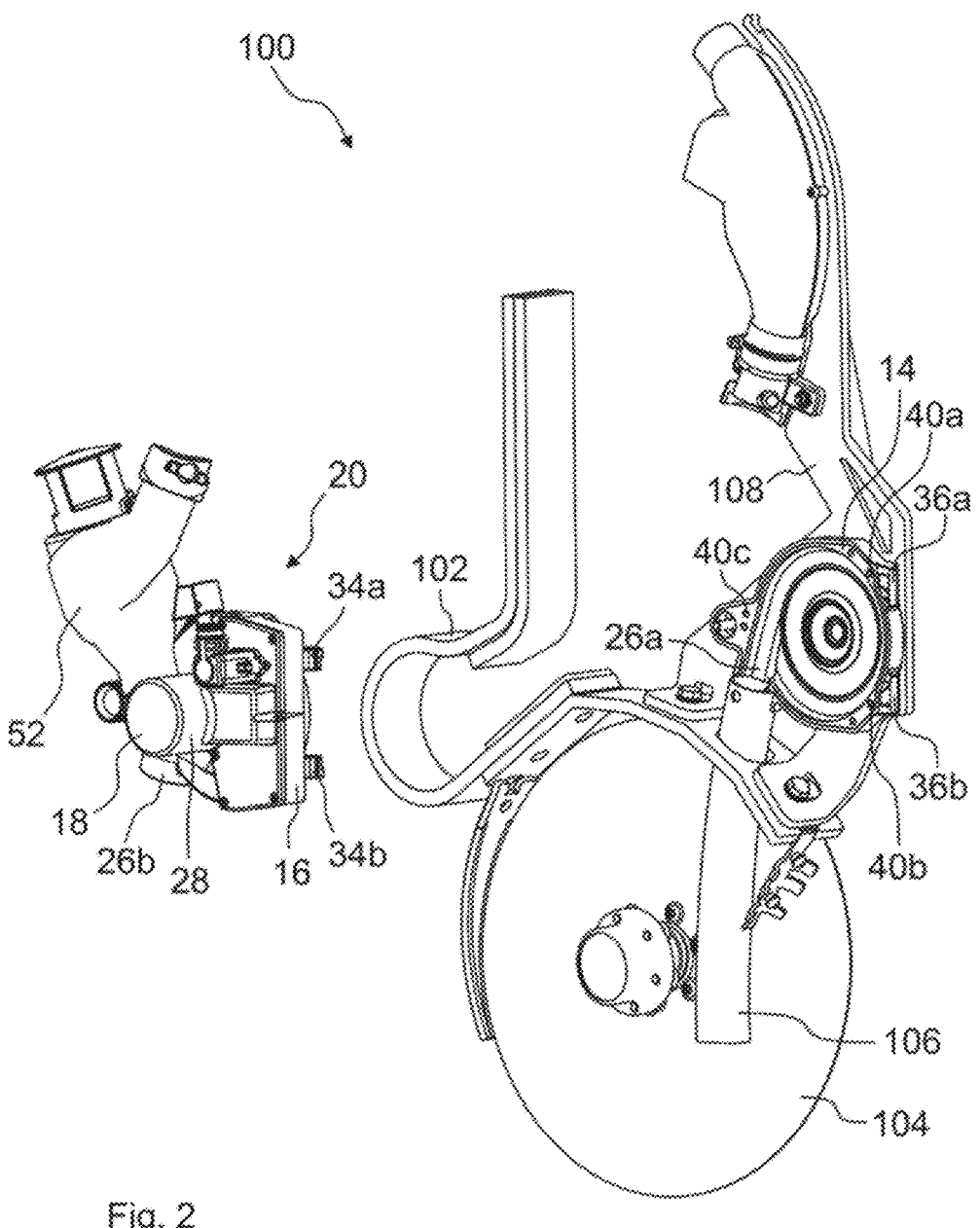
FIG. 2 shows a perspective view of the spreading unit shown in FIG. 1 after detaching the portioning module of the granulate portioning means of the portioning system.

FIG. 2 shows the spreading unit 100 with the portioning module 20 removed. The air separator 52 is attached to the portioning module 20 and can be removed from the housing main body 14 together with the portioning module 20. The housing cover 16, the electric drive device 18, the portioning rotor 30 and the air separator 52 can therefore together be removed from the housing main body 14 and fitted to the housing main body 14.

The electric drive device 18 has a drive housing 28 which is fastened to the housing cover 16. The electrical components of the electrical drive device 18 are located in the drive housing 28. The drive housing 28 is connected to the housing cover 16 via screw connections in a form-fit and/or force-fit manner. In other embodiments, the drive housing 28 can also be connected to the housing cover 16 in a form-fit manner or can be an integral component of the housing cover 16.

The portioning module 20 has an inlet opening for granulate to be portioned by means of the granulate portioning means 10. The inlet opening is arranged at an inlet connection piece 22, wherein the inlet connection piece 22 is a component of the housing cover 16. The portioning module 20 further comprises a wall portion 26b of an outlet channel for granulate portions to be discharged from the granulate portioning means 10. The housing main body 14 also comprises a wall portion 26a of the outlet channel, so that the outlet channel is formed by the wall portions 26a, 26b of the portioning module 20 and the housing main body 14.

Figure 3:
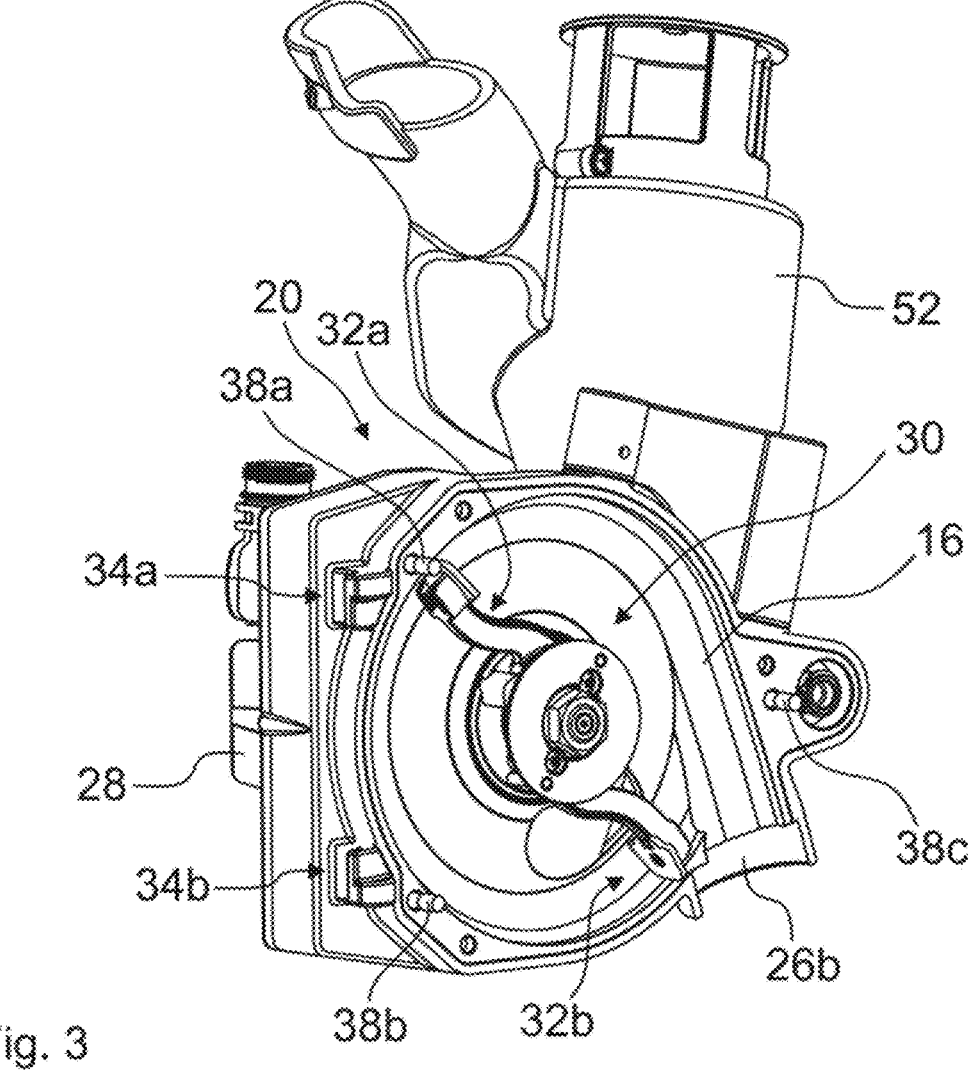
FIG. 3 shows a perspective view of the portioning module and air separator shown in FIG. 2.

FIG. 3 shows that the portioning rotor 30, as a component of the portioning module 20, can be removed from the housing main body 14 together with the housing cover 16. The portioning rotor 30 is secured to the portioning module 20 against falling out when the portioning module 20 is removed, so that handling of the portioning module 20 is simplified.

The portioning rotor 30 has two rotor blades 32a, 32b arranged on opposite sides, wherein the rotor blades 32a, 32b, during a rotational movement of the portioning rotor 30, combine granulate grains located in the housing 12 of the granulate portioning means 10 to form granulate portions.

The portioning module 20 comprises assembly hooks 34a, 34b which can be inserted into hook receptacles 36a, 36b on the housing main body 14. When the assembly hooks 34a, 34b are inserted, the assembly hooks 34a, 34b together with the hook receptacles 36a, 36b form a hinge via which the portioning module 20 can be swiveled towards the housing main body 14 and away from the housing main body 14.

Figure 4:
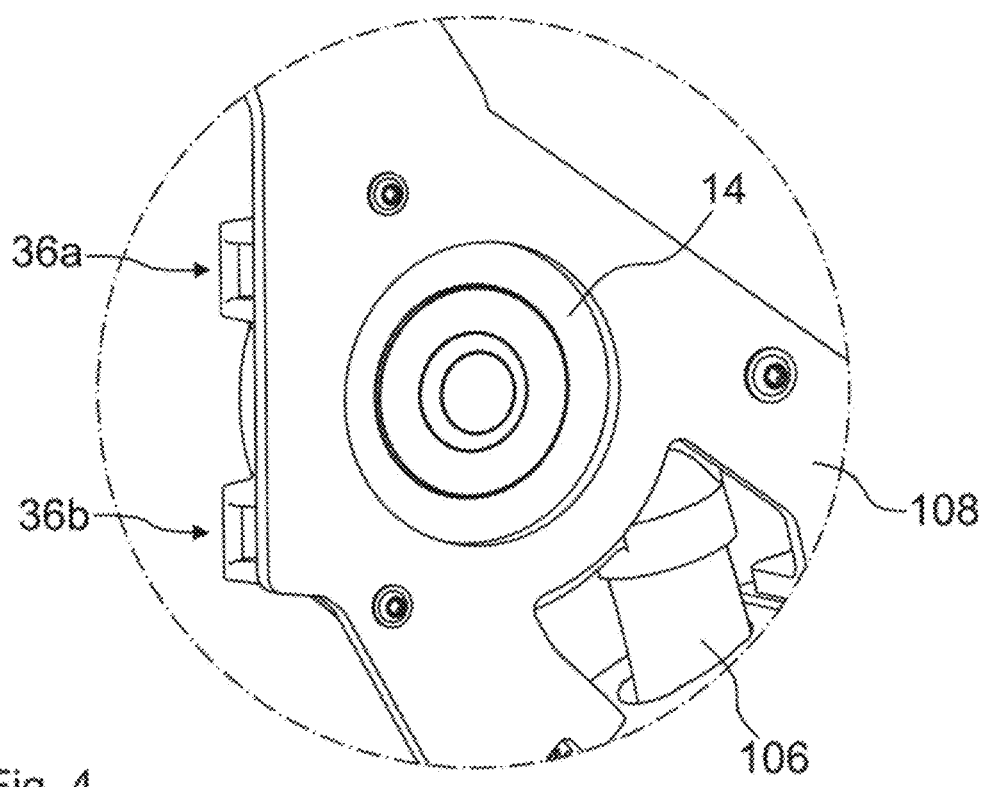
FIG. 4 shows a perspective view from behind of the housing main body of the granulate portioning means shown in FIG. 2.

FIG. 4 shows that the housing main body 14 of the granulate portioning means 10 is screwed to the carrier member 108 of the spreading unit 100. The carrier member 108 has a circular cut-out into which a circular protrusion of the housing main body 14 can be inserted for positioning the housing main body 14.

Figure 5:
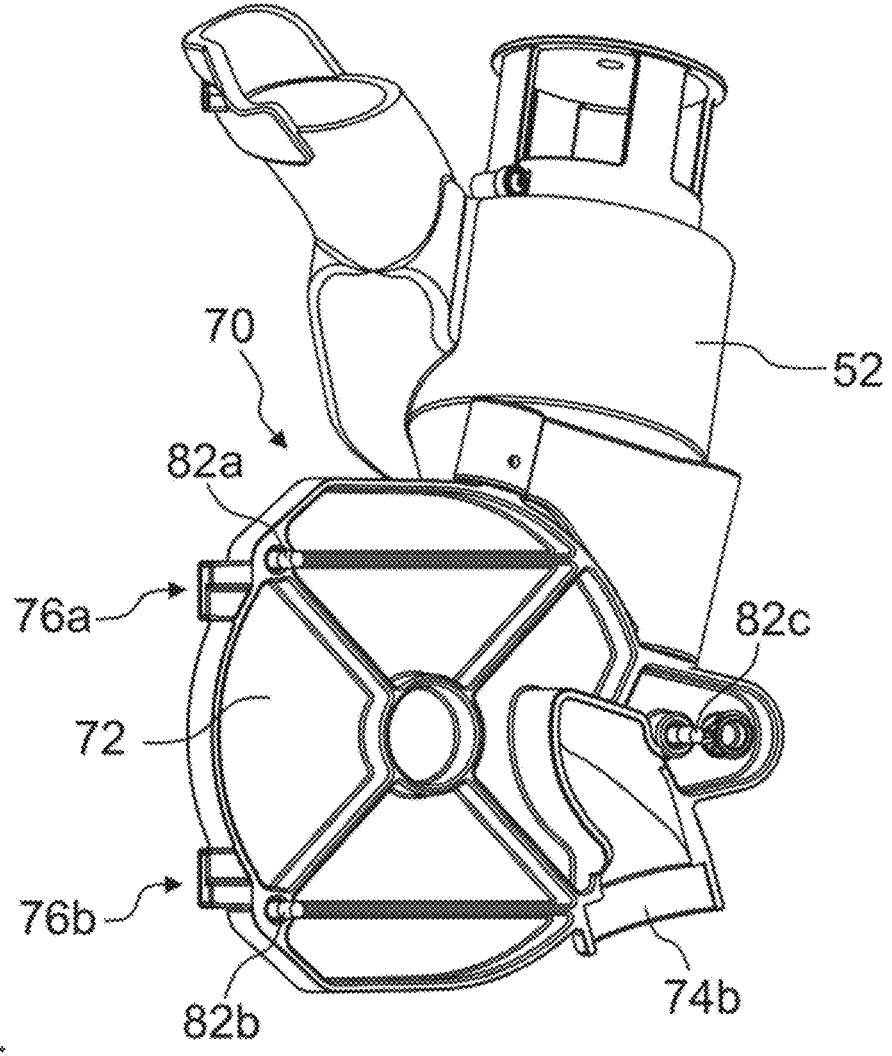
FIG. 5 shows a perspective view of a band placement module of an interchangeable system according to the invention, including an air separator.

FIG. 5 shows a band placement module 70 of an interchangeable system having a replacement housing cover 72. In addition to the band placement module 70, the interchangeable system also comprises a granulate portioning means 10 with a removable portioning module 20. The granulate portioning means 10 can be designed, for example, as shown in FIGS. 1 to 4.

The band placement module 70 is designed to be non-destructively and reversibly detachably assembled on the housing main body 14 for converting the granulate portioning means 10 from a portioning configuration to a band placement configuration instead of the portioning module 20 and, in the assembled state, to pass an air-granulate flow through the housing 12 of the granulate portioning means 10 comprising the replacement housing cover 72 without forming portions. The portioning configuration is shown in FIG. 1, for example.

The band placement module 70 comprises assembly hooks 76a, 76b which can be inserted into the hook receptacles 36a, 36b of the housing main body 14.

Figure 6:
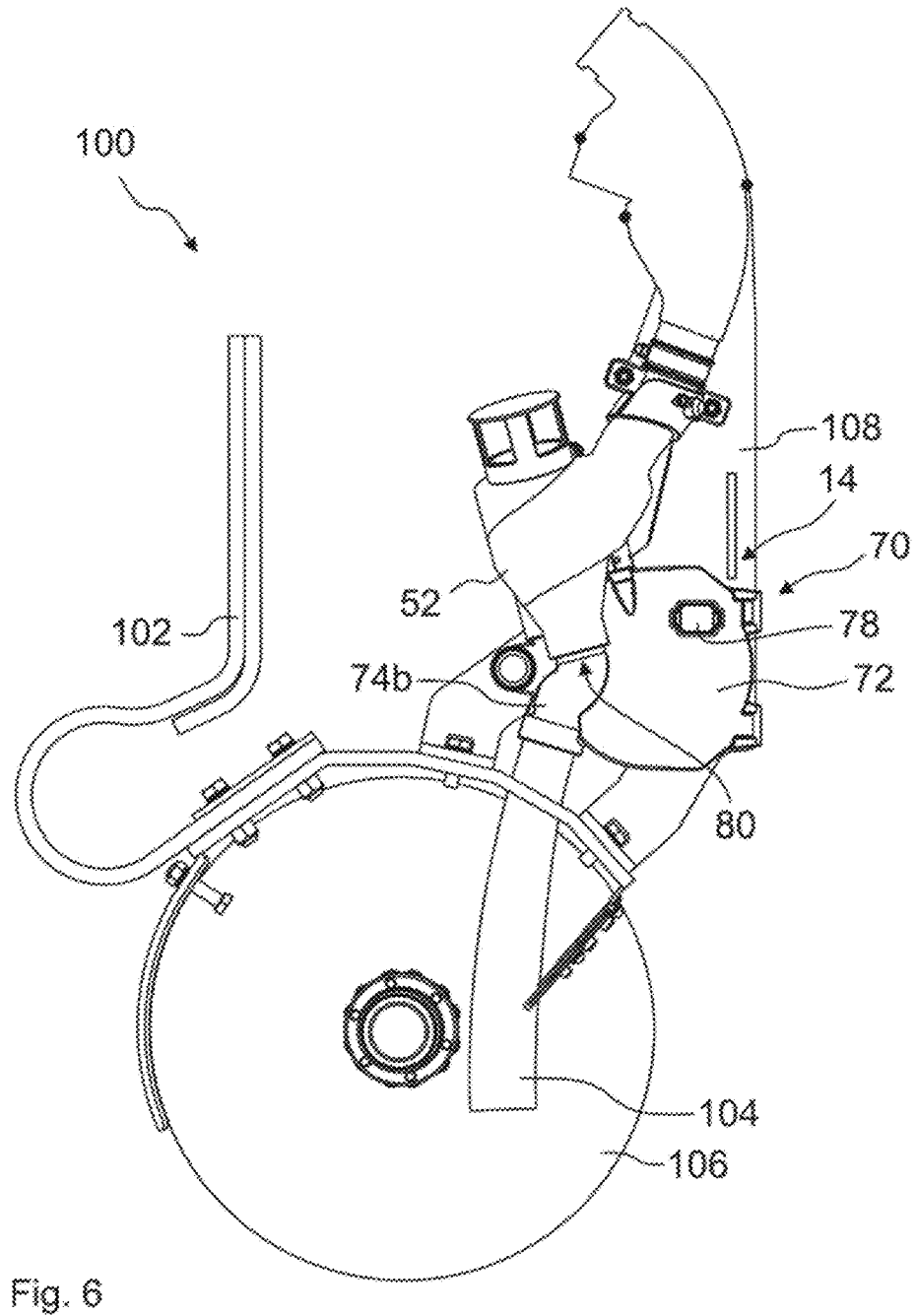
FIG. 6 shows a side view of the spreading unit shown in FIG. 1 after the portioning module has been replaced by the band placement module shown in FIG. 5.

FIG. 6 shows the granulate portioning means 10 in the band placement configuration. The band placement module 70 has an inlet connection piece 80. The inlet connection piece 80 has an inlet opening for the air-granulate flow to be passed through the granulate portioning means 10. The replacement housing cover 72 of the band placement module 70 further comprises a wall portion 74b of the outlet channel for an air-granulate flow to be discharged from the granulate portioning means 10. In the band placement configuration of the granulate portioning means 10, the outlet channel is formed by the wall portion 26a of the housing main body 14 and the wall portion 74b of the band placement module 70.

The band placement module 70 comprises a plug receptacle 78 for receiving a connector plug. In the portioning configuration (see FIG. 1), the connector plug is used to make electrical contact with the electrical drive device 18 in the portioning module 20. In the band placement configuration, the connector plug is not used, so that it is protected from damage and contamination by inserting it into the plug receptacle 78 on the replacement housing cover 72.

The housing cover 16 of the portioning module 20 and the replacement housing cover 72 of the band placement module 70 each comprise three pins 38a-38c, 82a-82c, which are used to position the portioning module 20 and to position the band placement module 70 on the housing main body 14, respectively. The housing main body has pin receptacles 40a-40c into which the pins 38a-38c, 82a-82c on the portioning module 20 or on the band placement module 70 can be inserted for positioning with repeat accuracy of the portioning module 20 or the band placement module 70.

LIST OF REFERENCE SIGNS

10 Granulate portioning means
12 Housing
14 Housing main body
16 Housing cover
18 Drive device
20 Portioning module
22 Inlet connection piece
26a, 26b Wall portions
28 Drive housing
30 Portioning rotor
32a, 32b Rotor blades
34a, 34b Assembly hooks
36a, 36b Hook receptacles
38a-38c Pins
40a-40c Pin receptacles
50 Portioning system
52 Air separator
70 Band placement module
72 Replacement housing cover
74b Wall portion
76a, 76b Assembly hooks
78 Plug receptacle
80 Inlet connection piece
82a-82c Pins
100 Spreading unit
102 Carrier element
104 Disk coulter
106 Placement line
108 Carrier member

The invention claimed is:

1. An interchangeable system for an agricultural spreading machine, comprising:

a granulate portioning means having a removable portioning module; and a band placement module comprising a replacement housing cover;

wherein the granulate portioning means comprises:

a portioning rotor which is configured to combine granulate grains during a rotational movement to form granulate portions;

a housing in which the portioning rotor is arranged, wherein the housing comprises a housing main body and a housing cover; and an electric drive device for rotational driving of the portioning rotor;

wherein the electric drive device is fastened to the housing cover, and the housing cover and the electric drive device are components of the removable portioning module which is assembled on the housing main body in a non-destructive and reversibly detachable manner, wherein the band placement module is configured to be non-destructively and reversibly detachably assembled on the housing main body for converting the granulate portioning means from a portioning configuration to a band placement configuration instead of the portioning module and, in the assembled state, to pass an air-granulate flow through the housing of the granulate portioning means comprising the replacement housing cover without forming portions.

2. The interchangeable system according to claim 1, wherein the portioning rotor is a component of the removable portioning module.

3. The interchangeable system according to claim 2, wherein the portioning rotor is secured to the portioning module against falling out when the portioning module is removed.

4. The interchangeable system according to claim 1, wherein the electric drive device has a drive housing which is fastened to the housing cover.

5. The interchangeable system according to claim 1, wherein the portioning module has an inlet opening for granulates to be portioned by means of the granulate portioning means.

6. The interchangeable system according to claim 1, wherein the portioning module comprises at least one wall portion of an outlet channel for granulate portions to be discharged from the granulate portioning means.

7. The interchangeable system according to claim 1, wherein the granulate portioning means comprises one or more positioning members by means of which the portioning module is configured to be positioned with repeat accuracy in an assembly position on the housing main body for assembling on the housing main body.

8. The interchangeable system according to claim 1, comprising:

an air separator into which an air-granulate flow can be introduced and which is configured to separate air from an introduced air-granulate flow; and wherein the granulate portioning means is connected to the air separator and is configured to produce granulate portions from an air-granulate flow which has passed the air separator.

9. The interchangeable system according to claim 8, wherein the air separator is connected to the portioning module of the granulate portioning means.

10. The interchangeable system according to claim 1, wherein the band placement module has an inlet opening for the air-granulate flow to be passed through the granulate portioning means.

11. The interchangeable system according to claim 1, wherein the band placement module comprises a plug receptacle for receiving a connector plug.

12. The interchangeable system according to claim 1, wherein the band placement module comprises at least one wall portion of an outlet channel for an air-granulate flow to be discharged from the granulate portioning means.

13. A method of operating an interchangeable system, comprising:

generating granulate portions by means of a granulate portioning means of the interchangeable system, wherein the granulate portioning means has a portioning configuration during the generation of granulate portions, in which a portioning module is assembled on a housing main body of the granulate portioning means;

converting the granulate portioning means from the portioning configuration to a band placement configuration by replacing the portioning module with a band placement module, so that in the band placement configuration the band placement module is assembled on the housing main body; and passing an air-granulate flow through the granulate portioning means without forming portions, wherein, during the passing of the air-granulate flow, the granulate portioning means has the band placement configuration in which the band placement module is assembled on the housing main body of the granulate portioning means.

* * * * *